United States Patent
O'Brien

(10) Patent No.: US 7,681,230 B2
(45) Date of Patent: Mar. 16, 2010

(54) DATA SYNCHRONIZATION FOR A SECURE ELECTRONIC DEVICE

(75) Inventor: Terence W. O'Brien, Webster, NY (US)

(73) Assignee: Harris Corporation, Melbourne, FL (US)

( * ) Notice: Subject to any disclaimer, the term of this patent is extended or adjusted under 35 U.S.C. 154(b) by 1053 days.

(21) Appl. No.: 11/363,604

(22) Filed: Feb. 28, 2006

(65) Prior Publication Data

US 2007/0204331 A1    Aug. 30, 2007

(51) Int. Cl.
G06F 21/00    (2006.01)
H04L 29/06    (2006.01)

(52) U.S. Cl. .............................. 726/4; 726/21; 713/166

(58) Field of Classification Search ..................... 726/4, 726/17, 27, 28, 29, 30, 21; 713/166
See application file for complete search history.

(56) References Cited

U.S. PATENT DOCUMENTS

| | | | | |
|---|---|---|---|---|
| 3,835,260 A * | 9/1974 | Prescher et al. | ............. | 379/237 |
| 5,140,684 A * | 8/1992 | Sakamura et al. | ........... | 711/163 |
| 5,596,718 A * | 1/1997 | Boebert et al. | ................ | 726/16 |
| 5,822,435 A * | 10/1998 | Boebert et al. | .............. | 713/192 |
| 5,845,067 A * | 12/1998 | Porter et al. | .................... | 726/4 |
| 6,295,605 B1 * | 9/2001 | Dockter et al. | ............. | 713/166 |
| 7,155,558 B1 * | 12/2006 | Vaghani et al. | ................ | 711/4 |
| 7,277,546 B2 * | 10/2007 | Dhawan | ..................... | 380/269 |
| 7,280,030 B1 * | 10/2007 | Monaco | ..................... | 340/5.21 |
| 2001/0005848 A1 * | 6/2001 | Haverstock et al. | ............ | 707/1 |
| 2002/0112189 A1 * | 8/2002 | Syvanne et al. | ............. | 713/201 |
| 2003/0074457 A1 * | 4/2003 | Kluth | .......................... | 709/229 |
| 2003/0162555 A1 * | 8/2003 | Loveland | .................... | 455/502 |
| 2004/0223615 A1 * | 11/2004 | Dhawan | ..................... | 380/261 |
| 2004/0239497 A1 * | 12/2004 | Schwartzman et al. | ... | 340/539.1 |
| 2005/0240528 A1 * | 10/2005 | Hendrick | ..................... | 705/44 |
| 2006/0047455 A1 * | 3/2006 | Catelani et al. | ............... | 702/85 |
| 2007/0283420 A1 * | 12/2007 | Rantalahti | ..................... | 726/4 |

* cited by examiner

*Primary Examiner*—Gilberto Barron, Jr.
*Assistant Examiner*—Soheila Davanlou
(74) *Attorney, Agent, or Firm*—Darby & Darby PC; Robert J. Sacco

(57) ABSTRACT

Method for synchronizing stored data in one device (102, 106, 202, 206, 210) with other devices (102, 106, 202, 206, 210) at multiple levels of security classification. The methods and systems disclosed herein can advantageously utilize unique protocols and, optionally, cryptographic technologies to effect data synchronization in a secure manner.

17 Claims, 11 Drawing Sheets

Single-Level
Device-to-Device
Data Synchronization

Single-Level
Device-to-Device
Data Synchronization

Case 1 of 9: Data Synchronization - Network/
SLS OS/SLS FS Network-Attached Device/No Local Device Case 2 of 9: Data Synchronization - Network/
SLS OS/SLS FS Network-Attached Device/
SLS OS/SLS FS Local Device Case 3 of 9: Data Synchronization - Network/
SLS OS/MLS FS Network-Attached Device/No Local Device Case 6 of 9: Data Synchronization - Network/
MLS OS/MLS FS Network-Attached Device/No Local Device Case 7 of 9: Data Synchronization - Network/
MLS OS/MLS FS Network-Attached Device/
SLS OS/SLS FS Local Device Case 8 of 9: Data Synchronization - Network/ MLS OS/MLS FS Network-Attached Device/ SLS OS/MLS FS Local Device

DATA SYNCHRONIZATION FOR A SECURE ELECTRONIC DEVICE

BACKGROUND OF THE INVENTION

1. Statement of the Technical Field

The inventive arrangements relate to data synchronization systems, and more particularly to data synchronization of secure electronic devices.

2. Description of the Related Art

There is a growing need to develop electronic information processing devices capable of storing, processing, and communicating data at multiple levels of security classification. For example, the security classification levels can include information designated as Top Secret, Secret, Confidential, Sensitive, and unclassified. The information processing devices developed for these secure devices must be able to synchronize managed data between a network server and network-attached device (e.g. desktop computer) or between a host device (e.g. desktop computer) and a locally-connected device (e.g. personal digital assistant). The managed data to be synchronized is often address book, calendar, task list, notes and/or e-mail information that has been saved at multiple security levels.

Current network-attached electronic devices perform synchronization of data at only a single-level of security classification "in-the-clear" (unencrypted); the user signs-on to the network-attached device which is connected via the network to a server computer. Thereafter, managed data objects at that 1 security level are updated.

Current portable electronic devices (PED) perform synchronization of data at only a single-level of security classification, namely "in-the-clear" (unencrypted), with no user authentication. The user simply plugs his/her PED into a cradle which is connected via a serial/Bluetooth link to a desktop computer that the user has logged into. Thereafter, managed data objects at that one security level are updated.

Certain types of information processing systems, including PEDs and personal computers, have been developed that are specifically designed to allow for processing of classified data having various designated levels of security. For example secure computers and even secure PDA devices known in the art. These devices typically utilize a trusted operating system, trusted microprocessors, and trusted human/machine interfaces. Such devices generally satisfy the requirements for accessing single-level secure (SLS) or multi-level secure (MLS) file systems.

MLS is a class of systems that contain information with different sensitivities. MLS systems simultaneously permit access to data by users with different security clearances without compromising security. Thus, MLS data file systems allow information about different sensitivities (classifications) to be stored in an information system. These systems are also designed to allow users having different clearances, authorizations, and need-to-know, the ability to process information in the same system. Significantly, however, these systems prevent users from accessing information for which they are not cleared, do not have proper authorization, or do not have a need-to-know.

In a single level secure system (SLS), a user can have secure access to classified data at a single defined security level. The level of access can be limited by the current user security classification sign-on level and a security classification assigned to secure user processor. The secure processing system can have a single level of secure data contained in its file system. Alternatively, the file system can be an MLS system, but user access can be limited to a single secure level, such as the confidential file system, secret level file system, or top secret levels file system contained on the MLS file system.

SUMMARY OF THE INVENTION

The invention concerns information processing devices that are capable of synchronizing stored data with other devices at multiple levels of security classification. The methods and systems disclosed herein can advantageously utilize unique protocols and, optionally, cryptographic technologies to effect data synchronization in a secure manner.

In order to achieve this result, several criteria are preferably satisfied. The devices involved in the synchronization must establish a trust relationship between the two data devices utilizing authentication operations (e.g. X.509 Public Key Infrastructure operations) prior to any data synchronization operations. The devices can optionally utilize encryption/decryption for data confidentiality and hashing for data integrity checking on the inter-device communication link. Further, the device can invoke multiple single-level device-to-device data synchronization operations if two or more devices involved in the data synchronization operation contain a multi-level secure file system.

DETAILED DESCRIPTION OF THE PREFERRED EMBODIMENTS

Figure 1:
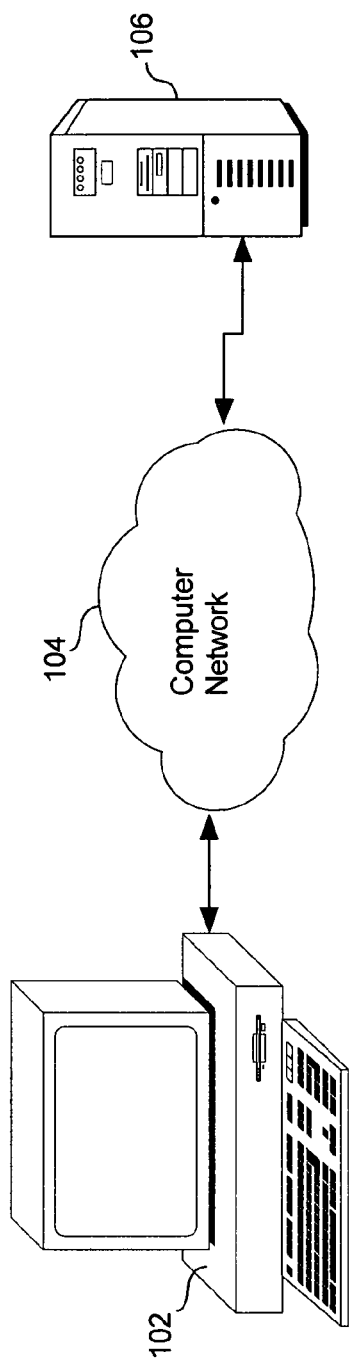
FIG. 1 is a block diagram that shows a network-attached device that can be synchronized to a network server.
Figure 2:
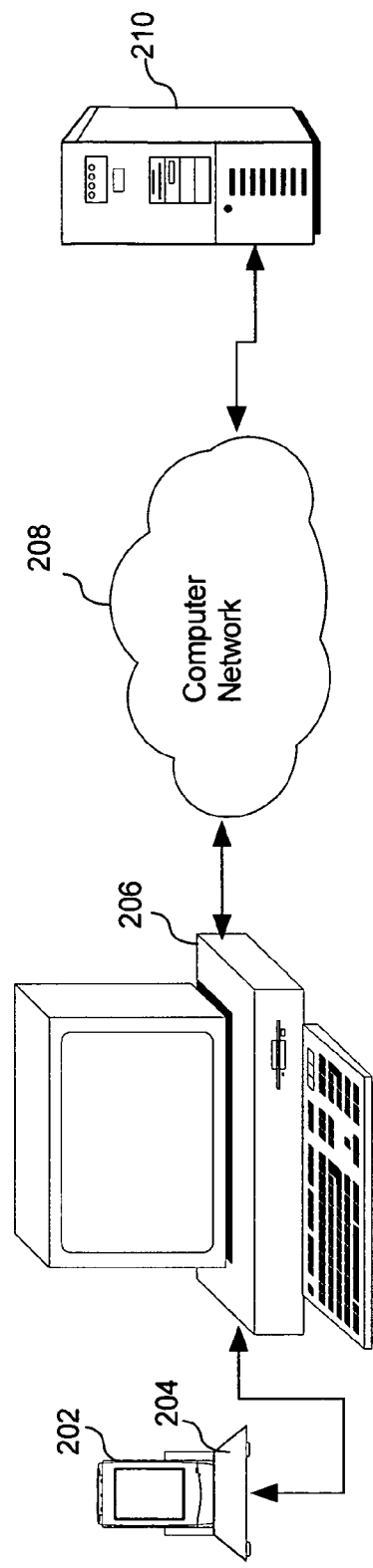
FIG. 2 is a block diagram that shows a locally-connected device that can be synchronized to a host device.

FIGS. 1 and 2 illustrate two examples of electronic information processing devices that are capable of storing, processing, and communicating data at one or more levels of security classification. For example, security classification levels can include information designated as Top Secret, Secret, Confidential, Sensitive, and unclassified. Referring to FIG. 1, a first example of an electronic information processing device can include a network attached device (NAD) 102. In many instances, it can be advantageous for the NAD to synchronize managed data, contained on such device, with a second device. For example, it can be desirable to synchronize managed data contained on the NAD 102 with a server 106 that communicates with the NAD over a network 104. The managed data to be synchronized can be, but is not limited to, address book data, calendar data, task list data, documents, audio, image or video files, notes and/or e-mail information that has been saved at one or more security levels.

In FIG. 1, the NAD is illustrated as a desktop computer. However, it should be understood that the invention is not limited in this regard. Instead, the NAD 102 can be any electronic information processing device that is capable of storing, processing, and communicating data at one or more levels of security classification.

Referring now to FIG. 2, a second example of an electronic information processing device can include a locally connected device (LCD) 202. In many instances, it can be advantageous for the LCD 202 to synchronize managed data, contained on such device, with a second device. For example, it can be desirable to synchronize managed data contained on the LCD 202 with a host device 206. As shown in FIG. 2, a local connection can be provided between the host device 206 and the LCD 202. The LCD 202 can be connected to the host device 206 via any suitable means, such as a wired or wireless data connection service. For example, a wired serial data link or the Bluetooth standard could be used to connect the cradle to the host computer.

It may also be noted that In FIG. 2, the LCD 202 is illustrated as a personal electronic device. The personal electronic device is shown connected to the host device 206 by means of a cradle 204 that provides a convenient means for connecting the personal electronic device to the host device 206. The cradle can be connected to the host device via any suitable wired or wireless data connection system as described above. Alternatively, the personal electronic device could be directly connected to the host device by such means, without the need for a cradle.

Regardless of the specific arrangement that is used to connect the LCD 202 to the host device 206, it should be understood that the LCD is not limited to being a personal electronic device. Instead, the LCD 202 can be any electronic information processing device that is capable of storing, processing, and communicating data at one or more levels of security classification.

As shown in FIG. 2, the host device 206 can also be a NAD. For example, the host device can be connected to a server 210 by means of a computer network 208. Consequently, in addition to the synchronization of data as between the LCD and the host device 206, it is possible to synchronize the data between the host device 206 and the server 210.

Current NADs perform synchronization of data at only a single-level of security classification "in-the-clear" (unencrypted). Typically, the user signs-on to the NAD (e.g. desktop computer) which is connected via the network to a server computer. Thereafter, managed data objects at that one security level are updated. A similar approach is used with conventional LCDs, including various types of portable electronic devices (PED). Such LCDs typically perform synchronization of data at only a single-level of security classification, namely "in-the-clear" (unencrypted), with no user authentication. The user simply plugs his/her PED into a cradle which is connected via a serial/Bluetooth link to a desktop computer that the user has logged into. Thereafter, managed data objects at that one security level are updated.

In contrast, the present invention concerns information processing devices that are capable of synchronizing stored data with other devices at multiple levels of security classification. The methods and systems disclosed herein can advantageously utilize unique protocols and, optionally, cryptographic technologies to effect data synchronization in a secure manner.

In order to achieve this result, several criteria are preferably satisfied. The devices involved in the synchronization must establish a trust relationship between the two data devices utilizing authentication operations (e.g. X.509 Public Key Infrastructure operations) prior to any data synchronization operations. The devices can optionally utilize encryption/decryption for data confidentiality and hashing for data integrity checking on the inter-device communication link. Further, the device can invoke multiple single-level device-to-device data synchronization operations if two or more devices involved in the data synchronization operation contain a multi-level secure file system.

Figure 3:
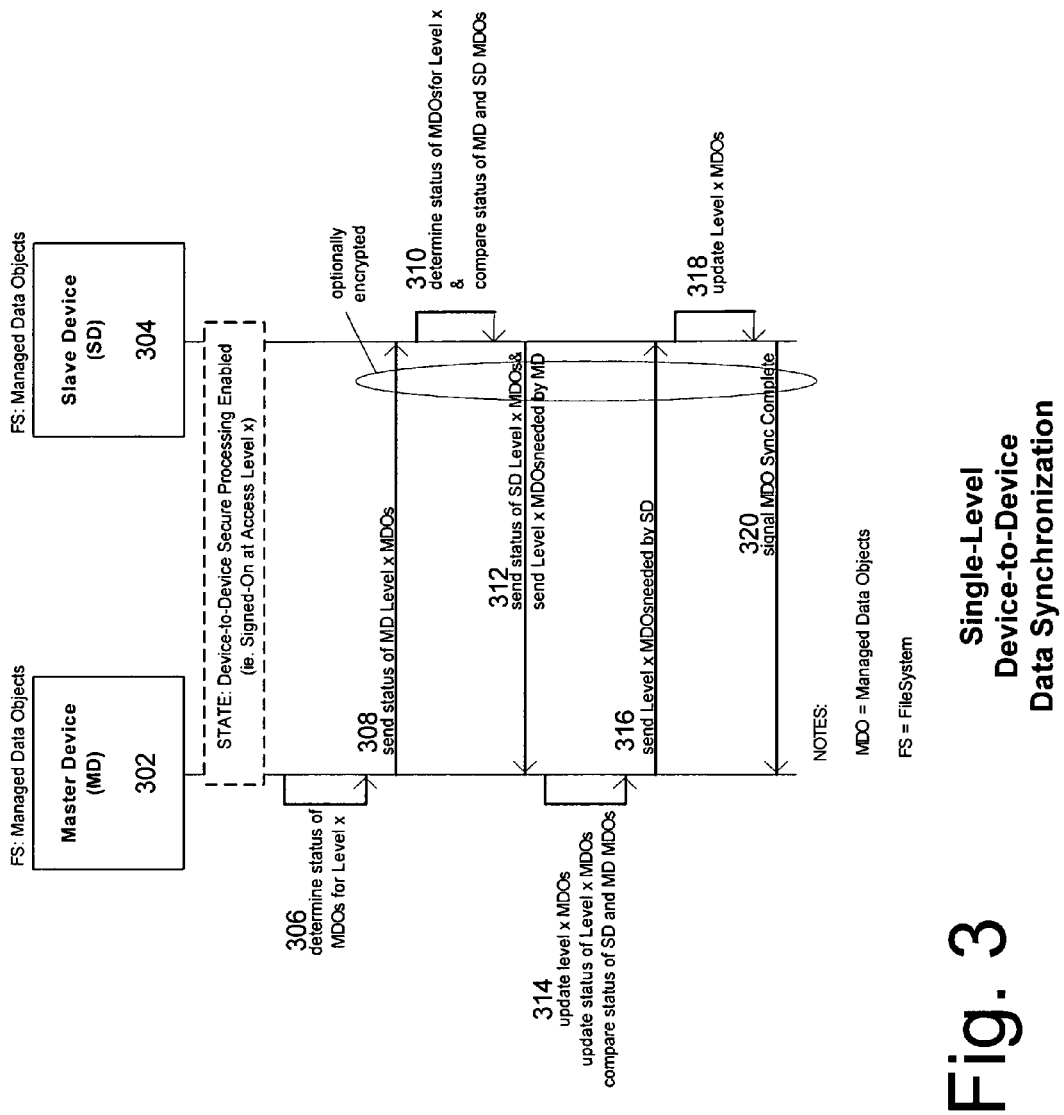
FIG. 3 an interaction diagram that is useful for understanding a single-level device-to-device data synchronization.

Details of a single-level device-to-device data synchronization operation are shown in FIG. 3. Referring now to FIG. 3, there is shown an interaction diagram that is useful for understanding a process for secure synchronization of data contained on a first device and a second device. An initial step in the process illustrated in the interaction diagram involves establishing a trust relationship between the devices that are to be synchronized. Such a trust relationship allows the establishment of a device to device single-level secure processing state as between said first device and said second device at a first defined security access level. In general, a first step in establishing such a state requires authenticating a user, authenticating the first device and authenticating the second device. For example, in FIG. 2, this step could involve (a) authenticating the identity of a user (not shown in FIG. 2), (b) authenticating the identity of a specific NAD, such as host device 206, and (c) authenticating the identity of a specific network server, such as server 210. Alternatively, or in addition, device authentication can include authenticating the identity of locally connected device 202.

Any suitable means can be utilized for authenticating the identity of the user and the various devices. For example, X.509 standard promulgated by ITU-T for Public Key Infrastructure operations can be used for this purpose. X.509 specifies, among other things, standard formats for public key certificates and a certification path validation algorithm.

According to one embodiment of the invention, a user of a first device can authenticate their identity by presenting user access credentials containing maximum access level allowed via a hardware token (e.g. Common Access Card with X.509 certificate) and a user password. The operating system of the first device will submit the password to the hardware token to unlock the token and access the certificate information. The operating system of the first device will use the certificate information, public key operations, and public key infrastructure (e.g. PKI certificate authority possibly including a certificate revocation list) to authenticate the user and their maximum security access level allowed. If the operating system is a multi-level secure operating system, then it can also prompt the user to select the access level they wish to sign-on at. If the defined security access level at which the user requests to sign on is lesser than or equal to an assigned security access level of the particular user, then the user can be permitted to sign on at the requested level. Of course, the foregoing assumes that device can accommodate that defined security level.

The device-to-device secure processing state is established via a two stage process. The first phase is a device-to-device PKI-based authentication. The Master device sends its credentials which had previously been stored securely on the Master device to the Slave device. Upon cryptographic-acceptance of the Master device's credentials, the Slave device sends its credentials which had previously been stored securely on the Slave device to the Master device. Upon cryptographic-acceptance of the Slave device's credentials, the second phase is entered. The second phase is a user-to-remote device PKI-based authentication. The Master device sends the user's credentials which had been obtained from a token as described above or from a previous device-to-device security establishment session to the Slave device. Upon cryptographic-acceptance of the user's credentials, the Slave device signals the device-to-device secure processing state has been successfully established. At this point, the device-to-device secure processing state is established at the level requested by the user.

It should be noted that the invention is not limited to the particular process described above for establishing device to device secure processing. Instead, the device-to-device secure processing state can be established by any suitable means. The particular process utilized is not critical, provided that whatever process is used, it should provide a high degree of assurance that the user and devices, as well as any security access level limitations, are fully authenticated.

Once the device to device secure processing state has been established by appropriate means, the next step can be to synchronize one or more managed data objects (MDOs) stored on the first device and the second device at the particular security access level requested by the user. The process for synchronizing each MDO is shown in FIG. 3. As shown in FIG. 3, one of the first and second devices can be a master device 302, that initiated the operation, whereas the other can be a slave device 304.

The process in FIG. 3 can begin in step 306 with the master device 302 determining a status of a plurality of MDOs stored on the master device and having a particular defined security access level (hereinafter "Level x"). The status of these MDOs can be communicated to the slave device 304 in step 308. In step 310, the slave device can determine the status of its MDOs for Level x and compare them to the status of the MDOs of the master device 302. In step 312, this information can be provided to the master device 302. In step 314, the master device can (1) update the Level x MDOs, (2) update the status of Level x MDOs, and (3) compare the status of the slave device MDOs with the master device MDOs. Thereafter in step 316, the master device can transmit to the Level x MDOs that are needed for updating the slave device MDOs. In step 318, the slave device updates its Level x MDOs. Finally, in step 320, the slave device 304 can signal to the master device that MDO synchronization is complete.

The foregoing process is useful for understanding the synchronization process for MDOs at Level x contained on a first and second (master and slave) device. However, it should be understood that the particular process shown in FIG. 3 is merely one possible example of an MDO synchronization process. Instead, the invention can include any suitable procedure for updating the MDOs at a particular level. Further, it will be appreciated that communications and messaging between the master device and the slave device in FIG. 3 can optionally be performed in an encrypted format. Various encryption systems and methods for performing such communications are well known in the art. Finally, it will be appreciated by those skilled in the art that the synchronizing process described herein can be performed by a direct connection between the master device 302 and the slave device 304, exclusive of any intermediate computer network. For example, the master and slave device could be arranged in the manner of LCD 202 and host computer 206. Alternatively, the master and slave device could be arranged as shown in FIG. 1, with an intervening computer network facilitating communications between the two devices. For example, the master device 302 could be NAD 102 and the slave device could be server 106.

Referring now to FIGS. 4 through 12 there are illustrated a series of interaction diagrams that show inter-device authentication and single-level data synchronization operations for each of a plurality of applicable combinations of device operating systems and file systems. There are several variables that can affect the choice of which process is used. For example, the operating systems of each of the NAD, network server and LCD can be single-level secure (SLS) or multi-level-secure (MLS). Some devices can be connected directly whereas others can be connected by means of a computer network. Also, some combinations can include a LCD, whereas other arrangements may not. In all, FIGS. 4-12 illustrate interaction processes for nine different combinations of devices, operating systems, and file systems.

Figure 4:
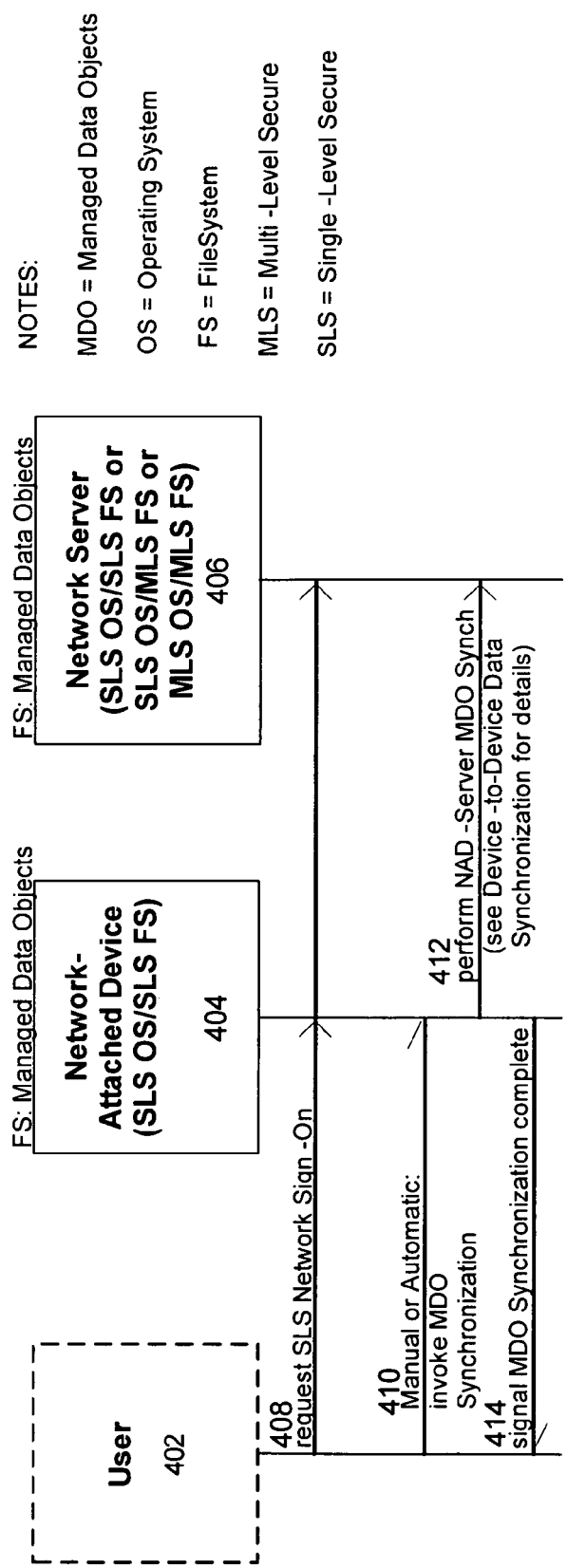
FIG. 4 is an interaction diagram that is useful for understanding an inter-device authentication and single-level secure data synchronization operation for a first combination of device operating systems and file systems.

Referring now to FIG. 4, there is illustrated an interaction diagram for synchronization of a NAD 404 and a network server 406. The NAD 404 communicates with the server 406 through a computer network, which is not shown. NAD 404 has a SLS operating system and a SLS file system. Network server 406 can have (1) a SLS operating system and SLS file system, (2) SLS operating system and MLS file system, or (3) MLS operating system and MLS file system.

The interactive process in FIG. 4 can begin in step 408 when a user 402 requests an SLS network sign on. The SLS network sign-on process can establish a device to device secure processing state in a manner similar to that previously described in relation to FIG. 3. In step 410, the overall MDO synchronization process can be initiated automatically or manually as a result of a user input. In response, NAD 404 can perform a SLS device-to-device synchronization in step 412 using the process described in FIG. 3. Thereafter, in step 414, the NAD can signal that the MDO synchronization is complete. Since the NAD is only a SLS operating system and SLS file system, no further synchronization steps are necessary.

Figure 5:
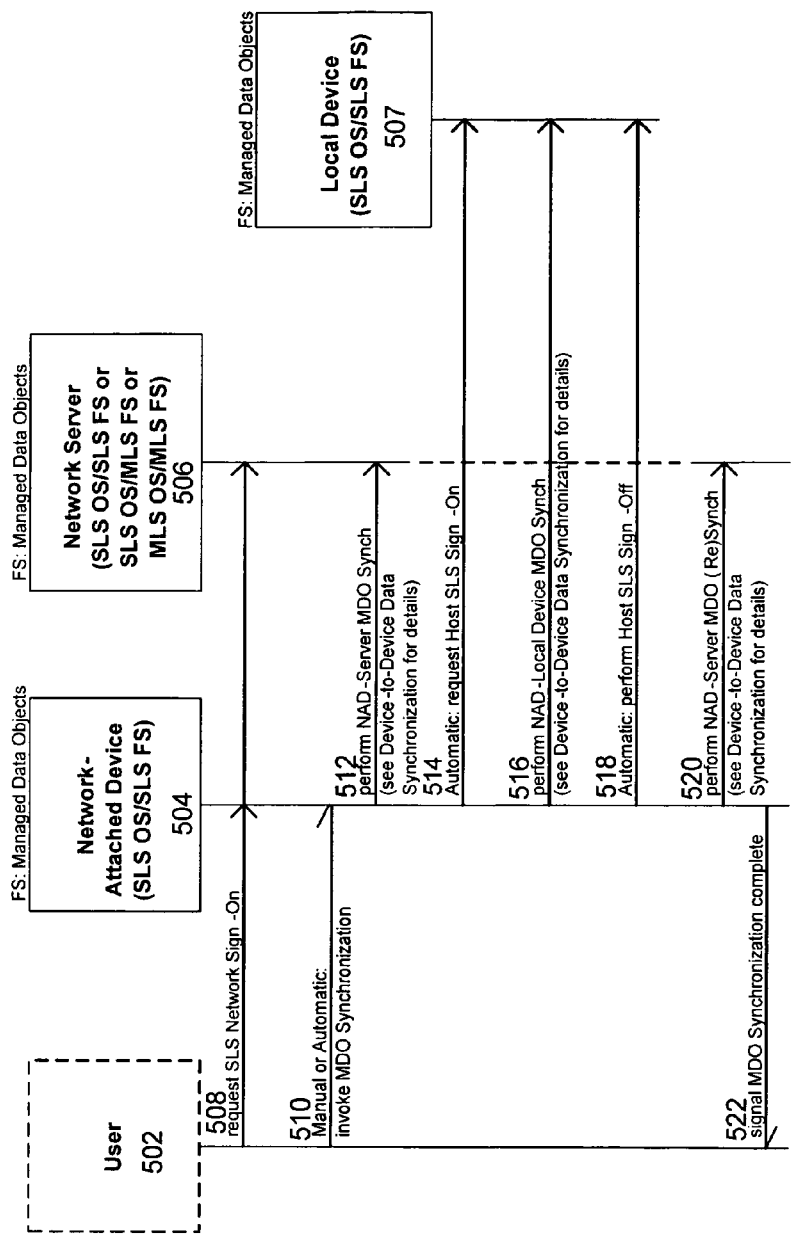
FIG. 5 is an interaction diagram that is useful for understanding an inter-device authentication and single-level secure data synchronization operation for a second combination of device operating systems and file systems.

Referring now to FIG. 5 there is illustrated an interaction diagram for synchronization of a NAD 504, a network server 506, and a LCD 507. The NAD 504 communicates with the server 506 through a computer network, which is not shown. The NAD 504 communicates directly with LCD 507 over a wired or wireless link. NAD 504 has a SLS operating system and a SLS file system. Network server 506 can have (1) a SLS operating system and SLS file system, (2) SLS operating system and MLS file system, or (3) MLS operating system and MLS file system. LCD 507 can have a SLS operating system and a SLS file system.

The interactive process in FIG. 5 can begin in step 508 when a user 502 requests an SLS network sign on. The SLS network sign-on process can establish a device to device secure processing state as between the NAD 504 and the network server 506 in a manner similar to that previously described in relation to FIG. 3. In step 510, MDO synchronization as between NAD 504 and network server 506 can be initiated automatically or manually as a result of a user input. In response, NAD 504 can in step 512 perform a SLS device-to-device synchronization with network server 506 using a process similar to the one described in FIG. 3.

In step 514, the NAD can automatically establish a device-to-device secure processing state with LCD 507 by requesting SLS sign on to the LCD. Thereafter, in step 516 the NAD 504 and LCD 507 can perform a device-to-device MDO synchronization in a manner similar to that previously described in relation to FIG. 3. In step 518, the NAD can perform an automatic sign-off to terminate the device-to-device secure processing state established in step 514. In step 520, the NAD can re-synchronize with network server 506 using a process similar to that described in FIG. 3. In step 522, the NAD can signal the user 502 that the MDO synchronization process is complete. Since the NAD 504 and LCD 507 both have SLS operating systems and SLS file systems, no further synchronization is necessary for these devices.

Figure 6:
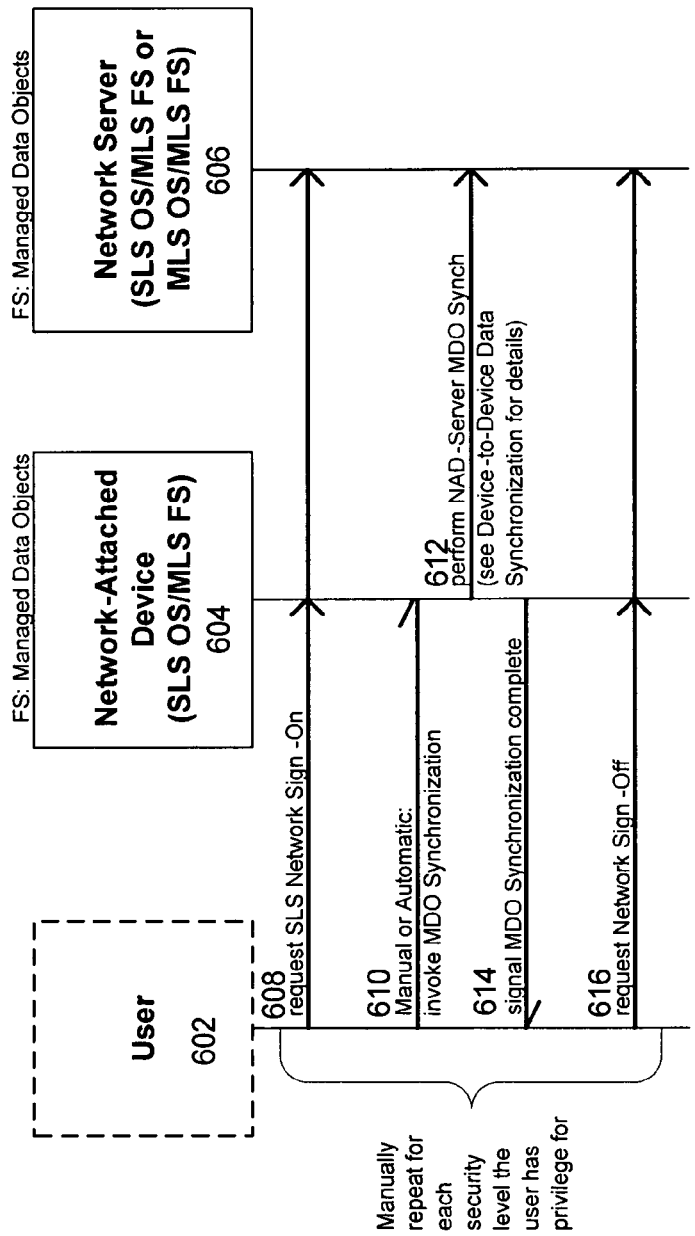
FIG. 6 is an interaction diagram that is useful for understanding an inter-device authentication and single-level secure data synchronization operation for a third combination of device operating systems and file systems.

Referring now to FIG. 6, there is illustrated an interaction diagram for synchronization of a NAD 604 and a network server 606. The NAD 604 communicates with the server 606 through a computer network, which is not shown. NAD 604 has a SLS operating system and a MLS file system. Network server 606 can have (1) a SLS operating system and MLS file system or (2) MLS operating system and MLS file system.

The interactive process in FIG. 6 can begin in step 608 when a user 602 requests an SLS network sign on. The SLS network sign-on process can establish a device to device secure processing state in a manner similar to that previously described in relation to FIG. 3. In step 610, the overall MDO synchronization process can be initiated automatically or manually as a result of a user input. In response, NAD 604 can perform a SLS device-to-device synchronization in step 612 using the process described in FIG. 3. Thereafter, in step 614, the NAD can signal that the MDO synchronization is complete. Since the NAD has a MLS file system, further synchronization steps are necessary. Accordingly, steps 608-616 can be re-initiated manually by a user for each defined security level the user has a privilege for. When all security levels have been synchronized in this way, the process is complete.

Figure 7:
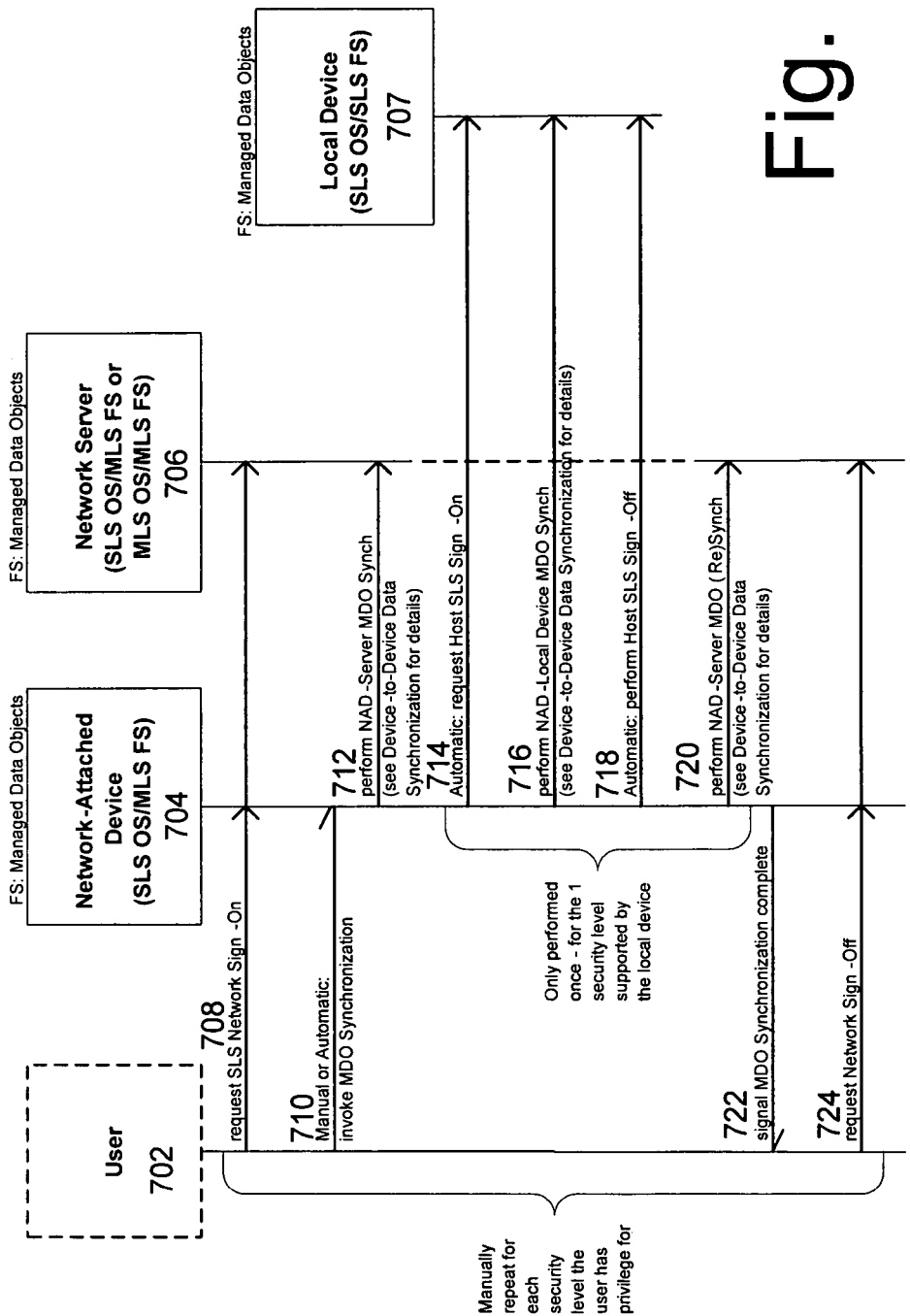
FIG. 7 is an interaction diagram that is useful for understanding an inter-device authentication and single-level secure data synchronization operation for a fourth combination of device operating systems and file systems.

Referring now to FIG. 7, there is illustrated an interaction diagram for synchronization of a NAD 704, a network server 706, and a LCD 707. The NAD 704 communicates with the server 706 through a computer network, which is not shown. The NAD 704 communicates directly with LCD 707 over a wired or wireless link. NAD 704 has a SLS operating system and a MLS file system. Network server 706 can have (1) a SLS operating system and MLS file system or (2) MLS operating system and MLS file system. LCD 707 can have a SLS operating system and a SLS file system.

The interactive process in FIG. 7 can begin in step 708 when a user 702 requests an SLS network sign on. The SLS network sign-on process can establish a device to device secure processing state as between the NAD 704 and the network server 706 in a manner similar to that previously described in relation to FIG. 3. In step 710, MDO synchronization as between NAD 704 and network server 706 can be initiated automatically or manually as a result of a user input. In response, NAD 704 can perform a SLS device-to-device synchronization with network server 706 in step 712 using a process similar to the one described in FIG. 3.

In step 714, the NAD can automatically establish a device-to-device secure processing state with LCD 707 by requesting SLS sign on to the LCD. Thereafter, in step 716 the NAD 704 and LCD 707 can perform a device-to-device MDO synchronization in a manner similar to that previously described in relation to FIG. 3. In step 718, the NAD can perform an automatic sign-off to terminate the device-to-device secure processing state with LCD 707 established in step 714. In step 720, the NAD can re-synchronize with network server 706 using a process similar to that described in FIG. 3. In step 722, the NAD 704 can signal the user 702 that the MDO synchronization process is complete.

Since the LCD 707 has an SLS file system, the synchronization process only needs to be performed once and no further synchronization is necessary for that device. However, NAD 704 has a multi-level secure file system that the user may have access to. MDOs at one or more additional levels may require synchronization with network server 706. Accordingly, steps 708-712 and steps 722-724 can be repeated to the extent necessary to synchronize the MDO at other security levels stored on NAD 704. For example, the process can be repeated for each defined security level that the user 702 has access to.

Figure 8:
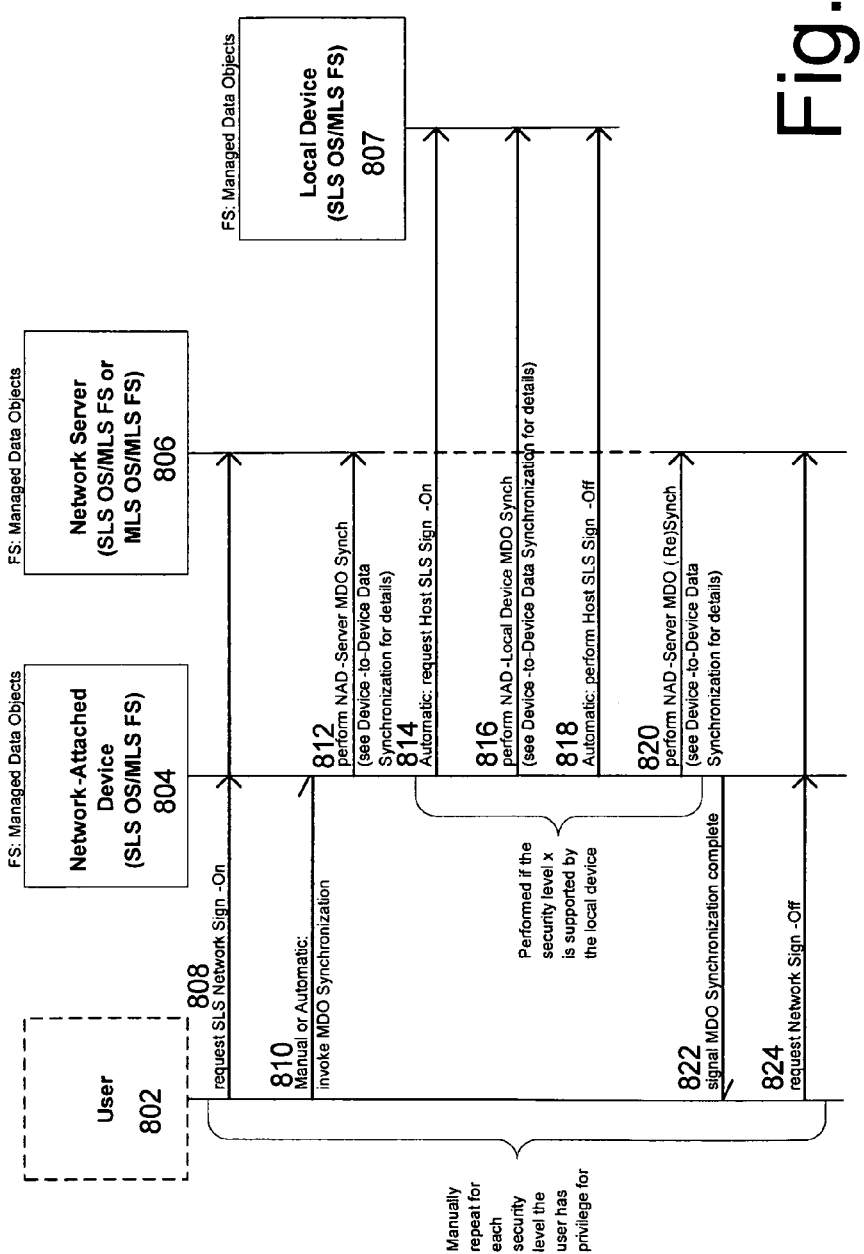
FIG. 8 is an interaction diagram that is useful for understanding an inter-device authentication and single-level secure data synchronization operation for a fifth combination of device operating systems and file systems.

Referring now to FIG. 8 there is illustrated an interaction diagram for synchronization of a NAD 804, a network server 806, and a LCD 807. The NAD 804 communicates with the server 806 through a computer network, which is not shown. The NAD 804 communicates directly with LCD 807 over a wired or wireless link. NAD 804 has a SLS operating system and a MLS file system. Network server 806 can have (1) a SLS operating system and MLS file system or (2) MLS operating system and MLS file system. LCD 807 can have a SLS operating system and a MLS file system.

The interaction process in FIG. 8, including steps 808, 810, 812, 814, 816, 818, 820, 822 and 824 correspond to steps 708, 710, 712, 714, 716, 718, 720, 722 and 724 in FIG. 7. However, in FIG. 8, LCD 807 has a MLS file system as compared to a single level secure file system in FIG. 7. Consequently, steps 814, 816, 818, and 820 can be repeated along with the remaining steps for each security level the user has access to. More particularly, as the synchronization of NAD 804 with network server 806 is repeated at each security level, the synchronization process of LCD 807 can be repeated for each such defined security level that is also supported by the LCD 807.

Figure 9:
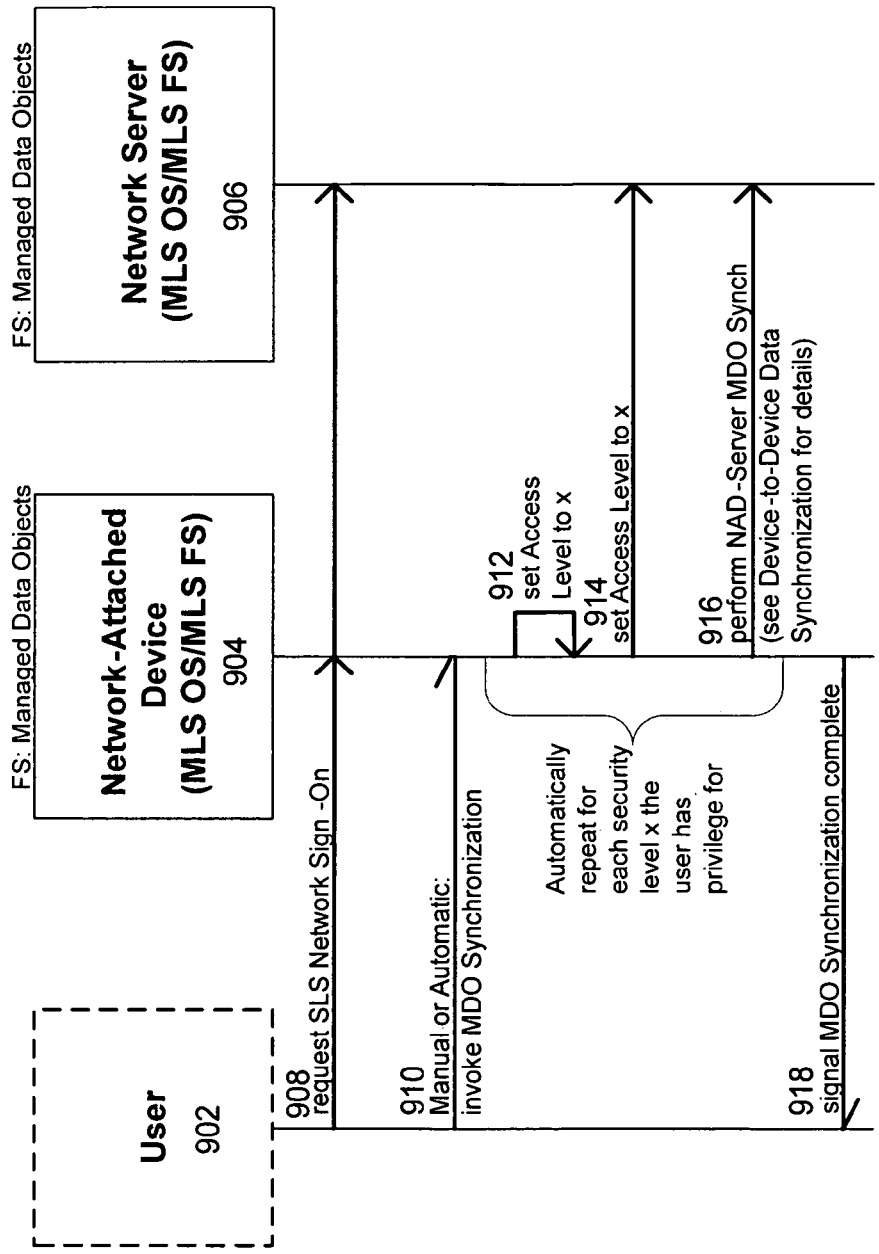
FIG. 9 is an interaction diagram that is useful for understanding an inter-device authentication and single-level secure data synchronization operation for a sixth combination of device operating systems and file systems.

Referring now to FIG. 9, there is illustrated an interaction diagram for synchronization of a NAD 904 and a network server 906. The NAD 904 communicates with the server 906 through a computer network, which is not shown. NAD 904 has a MLS operating system and a MLS file system. Network server 906 has a MLS operating system and MLS file system.

The interactive process in FIG. 9 can begin in step 908 when a user 902 requests an SLS network sign on. The SLS network sign-on process can establish a device to device secure processing state as between NAD 904 and network server 906 in a manner similar to that previously described in relation to FIG. 3. In step 910, the overall MDO synchronization process can be initiated automatically or manually as a result of a user input. In response, the NAD can in step 912 set its access level to a defined security access level, e.g. Level x. Thereafter, in step 914, the NAD 904 can send a message to network server 906 requesting that the network server 906 set its own defined security access level to Level x. In step 916, the NAD 904 and network server 906 can perform an MDO synchronization using a process similar to that previously described in relation to FIG. 3.

Notably, since NAD 904 and network server 906 are both MLS devices, steps 912, 914, and 916 can be repeated at each of the plurality of defined security access levels supported by the respective MLS file systems. With each repetition of step 912, the access level can be incremented to a different level until synchronization has occurred at all defined security access levels supported by the MLS file system. Synchronization of NAD 904 and network sever 906 will be limited to those defined security access levels for which the user has privileges. However, this process of synchronizing the MDOs at each of the security access levels can occur automatically in steps 912, 914, and 916 because both devices include MLS operating systems. With MLS operating systems it is possible to avoid the necessity of the user signing off and signing on at each security level. Instead, the operating system can provide access to MDOs at a plurality of security access levels. When the MDOs at each security access level that the user has privileges for have been synchronized, the NAD 904 can signal the user 902 in step 918 that the MDO synchronization process is complete.

Figure 10:
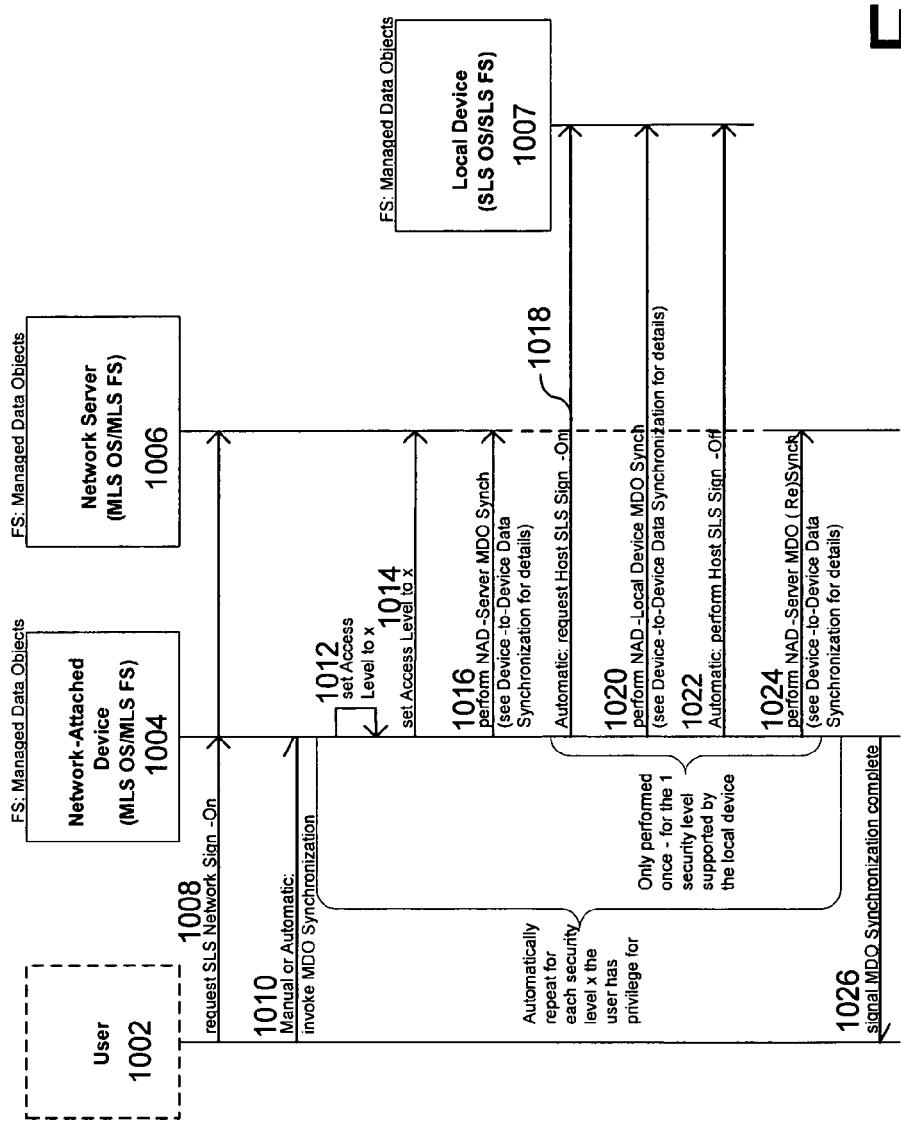
FIG. 10 is an interaction diagram that is useful for understanding an inter-device authentication and single-level secure data synchronization operation for a seventh combination of device operating systems and file systems.

Referring now to FIG. 10 there is illustrated an interaction diagram for synchronization of a NAD 1004, a network server 1006, and a LCD 1007. The NAD 1004 communicates with the server 1006 through a computer network, which is not shown. The NAD 1004 communicates directly with LCD 1007 over a wired or wireless link. NAD 1004 has a MLS operating system and a MLS file system. Network server 1006 has a MLS operating system and MLS file system. LCD 1007 can have a SLS operating system and a SLS file system.

The interactive process in FIG. 10 can begin in step 1008 when a user 1002 requests an SLS network sign on. The SLS network sign-on process can establish a device to device secure processing state as between NAD 1004 and network server 1006 in a manner similar to that previously described in relation to FIG. 3. In step 1010, the overall MDO synchronization process can be initiated automatically or manually as a result of a user input. In response the NAD can in step 1012 set its access level to a defined security access level, e.g. Level x. Thereafter, in step 1014, the NAD 1004 can send a message to network server 1006 requesting that the network server 1006 set its own defined security access level to Level x. In step 1016, the NAD 1004 and network server 1006 can perform an MDO synchronization using a process similar to that previously described in relation to FIG. 3.

In step 1018, the NAD can automatically establish a device-to-device secure processing state with LCD 1007 by requesting SLS sign on to the LCD. Thereafter, in step 1020 the NAD 1004 and LCD 1007 can perform a device-to-device MDO synchronization in a manner similar to that previously described in relation to FIG. 3. In step 1022, the NAD can perform an automatic sign-off to terminate the device-to-device secure processing state with LCD 1007 established in step 1014. In step 1024, the NAD can re-synchronize with network server 1006 using a process similar to that described in FIG. 3. The re-synchronization is necessary to update the network server MDOs with any changes that resulted from synchronization of the NAD 1004 with LCD 1007.

Note that steps 1018, 1020, 1022 and 1024 need only be performed once since the LCD is 1007 only has a SLS operating system. Accordingly, there are no MDOs at other defined security access levels, and therefore no need for repeating the synchronization process at those levels. In contrast, since NAD 1004 and network server 1006 both include MLS operating systems and MLS file systems, steps 1012, 1014, and 1016 can be automatically repeated at each of the plurality of defined security access levels supported by the respective MLS file systems. With each repetition of step 1012, the access level can be incremented to a different level until synchronization has occurred at all defined security access levels supported by the MLS file system.

Synchronization of NAD 1004 and network sever 1006 will be limited to those defined security access levels for which the user has privileges. For example, the NAD 1004 and/or network server 1006 can perform a test before changing the security access level to ensure that the user has privileges for that level. Still, it will be appreciated that the process of synchronizing the MDOs at each of the security access levels can occur automatically in steps 1012, 1014, and 1016 because both devices include MLS operating systems.

With MLS operating systems it is possible to avoid the necessity of the user signing off and signing on at each security level. Instead, the operating system can provide access to MDOs at a plurality of security access levels. When the MDOs at each security access level that the user has privileges for have been synchronized, the NAD 1004 can signal the user 1002 in step 1026 that the MDO synchronization process is complete.

Figure 11:
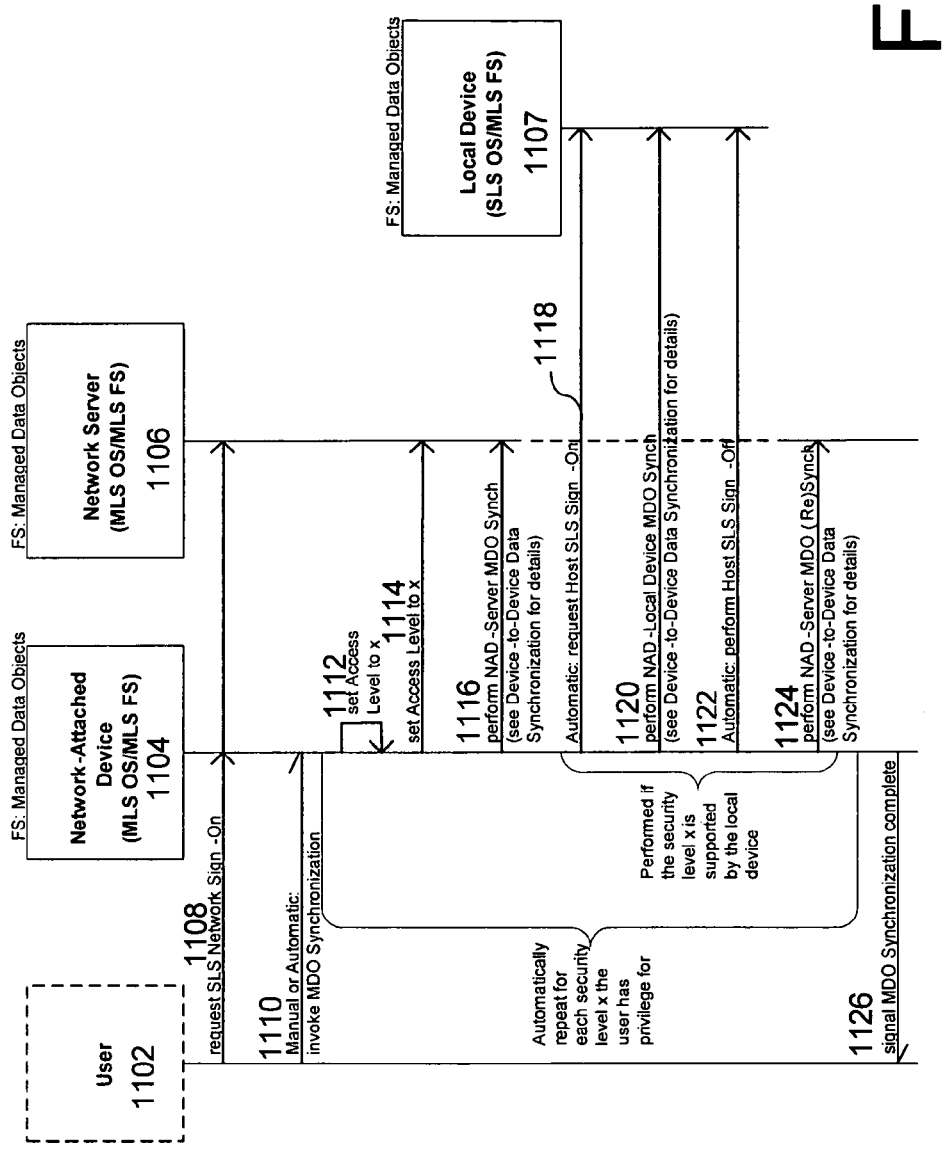
FIG. 11 is an interaction diagram that is useful for understanding an inter-device authentication and single-level secure data synchronization operation for an eighth combination of device operating systems and file systems.

Referring now to FIG. 11 there is illustrated an interaction diagram for synchronization of a NAD 1104, a network server 1106, and a LCD 1107. The NAD 1104 communicates with the server 1106 through a computer network, which is not shown. The NAD 1104 communicates directly with LCD 1107 over a wired or wireless link. NAD 1104 has a MLS operating system and a MLS file system. Network server 1106 has a MLS operating system and MLS file system. LCD 1107 can have a SLS operating system and a MLS file system.

The interaction process in FIG. 11 is similar in many respects to the interaction process in FIG. 10. The interactive process in FIG. 11 can begin in step 1108 when a user 1102 requests an SLS network sign on. The SLS network sign-on process can establish a device to device secure processing state as between NAD 1104 and network server 1106 in a manner similar to that previously described in relation to FIG. 3. In step 1110, the overall MDO synchronization process can be initiated automatically or manually as a result of a user input. In response, the NAD can in step 1112 set its access level to a defined security access level, e.g. Level x. Thereafter, in step 1114, the NAD 1104 can send a message to network server 1106 requesting that the network server 1106 set its own defined security access level to Level x. In step 1116, the NAD 1104 and network server 1106 can perform an MDO synchronization using a process similar to that previously described in relation to FIG. 3.

In step 1118, the NAD can automatically establish a device-to-device secure processing state with LCD 1107 by requesting SLS sign on to the LCD. Thereafter, in step 1120 the NAD 1104 and LCD 1107 can perform a device-to-device MDO synchronization in a manner similar to that previously described in relation to FIG. 3. In step 1122, the NAD can perform an automatic sign-off to terminate the device-to-device secure processing state with LCD 1107 established in step 1114. In step 1124, the NAD can re-synchronize with network server 1106 using a process similar to that described in FIG. 3. The re-synchronization is necessary to update the network server MDOs with any changes that resulted from synchronization of the NAD 1104 with LCD 1107. In step 1126, the NAD 1104 can signal to user 1102 that the MDO synchronization is complete.

In FIG. 11, steps 1112, 1114, 1116 can be automatically repeated for each security level for which user 1102 has a privilege. With each repetition of step 1112, the defined security access level can be incremented to a different level until synchronization has occurred at all defined security access levels supported by the MLS file system.

In contrast to the process described in relation to FIG. 10, steps 1118, 1120, 1122, and 1124 can also be repeated. The repetition of these steps can be necessary because in FIG. 11, the LCD also has a MLS file system. Consequently, MDOs at each defined security access level can require synchronization. Still, it will be appreciated that performance of steps 1118-1124 can be limited so that they are repeated only if the current MLS security Level x of NAD 1104 is one that is actually supported by the LCD 1107.

Figure 12:
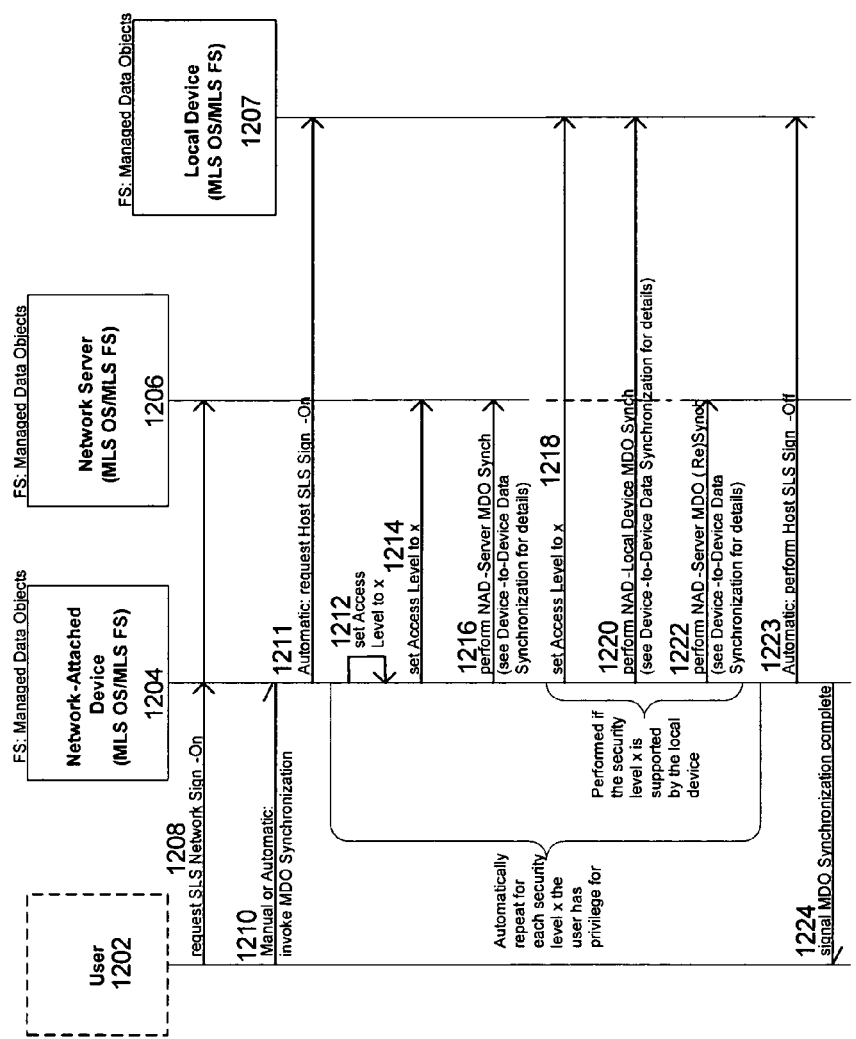
FIG. 12 is an interaction diagram that is useful for understanding an inter-device authentication and single-level secure data synchronization operation for a ninth combination of device operating systems and file systems.

Referring now to FIG. 12 there is illustrated an interaction diagram for synchronization of a NAD 1204, a network server 1206, and a LCD 1207. The NAD 1204 communicates with the server 1206 through a computer network, which is not shown. The NAD 1204 communicates directly with LCD 1207 over a wired or wireless link. NAD 1204 has a MLS operating system and a MLS file system. Network server 1206 has a MLS operating system and MLS file system. LCD 1207 can have a MLS operating system and a MLS file system.

The interaction process in FIG. 12 is similar in many respects to the interaction process in FIG. 11, except that in this case, the LCD also has a MLS operating system. Consequently, it is possible in this case to avoid the need to sign-on and sign-off for the purposes of synchronizing each MLS level of the LCD 1207.

The interactive process in FIG. 12 can begin in step 1208 when a user 1202 requests an SLS network sign on. The SLS network sign-on process can establish a device to device secure processing state as between NAD 1204 and network server 1206 in a manner similar to that previously described in relation to FIG. 3. In step 1210, the overall MDO synchronization process can be initiated automatically or manually as a result of a user input. In response NAD 1204 can automatically request in step 1211 to be signed onto LCD 1207 to establish a device-to-device secure processing state as between NAD 1204 and LCD 1207 in a manner similar to that described in relation to FIG. 3.

In step 1212 the NAD can set its access level to a defined security access level, e.g. Level x. Thereafter, in step 1214, the NAD 1204 can send a message to network server 1206 requesting that the network server 1206 set its own defined security access level to Level x. In step 1216, the NAD 1204 and network server 1206 can perform an MDO synchronization using a process similar to that previously described in relation to FIG. 3.

In step 1218, the NAD can send a message to the LCD 1207 requesting that the LCD set its defined security access level to Level x. There is no need in this instance to sign on or sign off at this point since the NAD has already established a device-to-device secure processing state with LCD 1207 in step 1211. In step 1220 the NAD 1204 and LCD 1207 can perform a device-to-device MDO synchronization in a manner similar to that previously described in relation to FIG. 3. In step 1222, the NAD can re-synchronize with network server 1206 using a process similar to that described in FIG. 3. The re-synchronization is necessary to update the network server MDOs with any changes that resulted from synchronization of the NAD 1204 with LCD 1207 at a particular defined security access level (Level x). In step 1223, the NAD 1204 can automatically sign-off of LCD 1207, ending the secure device-to-device session.

Notably, steps 1212, 1214, 1216, 1218, 1220, and 1222 can be repeated automatically for each security level x that the user has a privilege for. Repetition of these steps can be necessary to synchronize MDOs at each security level of the MLS files system associated with NAD 1204, network server 1206 and LCD 1207. Provided however, that repetition of steps 1218, 1220, and 1222 will be performed during each repetition only if the security level x to which the NAD is set is also supported by the LCD 1207. In step 1224, the NAD 1204 can signal to user 1202 that the MDO synchronization is complete.

In FIG. 12, steps 1212, 1214, 1216 can be automatically repeated for each security level for which user 1202 has a privilege. In contrast to the process described in relation to FIG. 10, steps 1218, 1220, and 1222, can also be repeated. The repetition of these steps can be necessary because in FIG. 12, the LCD also has a MLS file system. Consequently, MDOs at each defined security access level can require synchronization. Still, it will be appreciated that performance of steps 1218-1122 can be limited so that they are repeated only if the current MLS security Level x of NAD 1204 is one that is actually supported by the LCD 1206.

I claim:

1. A method for secure synchronization of data contained on a network-attached device and a network server, comprising:

establishing a device-to-device single-level secure processing state as between said network attached-device and said network server at a first defined security access level by
  (a) authenticating a user, said network attached device, and said network server;
  (b) determining an assigned security access level for said user from among a plurality of possible user security access levels; and
  (c) determining if said first defined security access level at which said user requests to sign on is lesser than or equal to said assigned security access level of said user;

selecting said network server to have a multi-level secure operating system and a multi-level secure file system;

selecting said network-attached device to have a multi-level secure operating system and a multi-level secure file system;

signing said user onto a computer network at said first defined security access level using at least one of said network attached device and said network server;

synchronizing a first plurality of managed data objects stored on said network attached device and said network server at said first defined security access level;

determining if said user is authorized to access a second defined security access level provided in said multi-level secure file system of said network server and said multi-level secure file system of said network attached device; and automatically repeating said synchronizing step for said second defined security access level.

2. The method according to claim 1, wherein said synchronizing step is performed by a direct connection between said network attached device and said network server, exclusive of any intermediate computer network.

3. A method for secure synchronization of data contained on a network-attached device and a network server, comprising:

establishing a device-to-device single-level secure processing state as between said network attached-device and said network server at a first defined security access level by
  (a) authenticating a user, said network attached device, and said network server;
  (b) determining an assigned security access level for said user from among a plurality of possible user security access levels; and
  (c) determining if said first defined security access level at which said user requests to sign on is lesser than or equal to said assigned security access level of said user;

synchronizing a first plurality of managed data objects stored on said network attached device and said network server at said first defined security access level establishing a second device to device single-level secure processing state as between said network-attached device and a locally-connected device that is locally connected to said network-attached device exclusive of any network connection, said network attached device and said locally-connected device connected at a second defined security access level;

selecting said network server to have a combination of an operating system and a file system selected from the group consisting of (a) a single-level secure operating system and a single-level secure file system, (b) a single level secure operating system and a multi-level secure file system, and (c) a multi-level secure operating system and a multi-level secure file system;

selecting said network-attached device to have a single-level secure operating system and a single-level secure file system;

selecting said locally connected device to have a single-level secure operating system and a single-level secure file system;

automatically synchronizing a second plurality of managed data objects stored on said network-attached device and said locally connected device at said second defined security access level;

automatically re-synchronizing said first plurality of managed data objects stored on said network-attached device and said network server.

4. The method according to claim 3, wherein said establishing of said second device to device single-level secure processing state further comprises authenticating at least said locally connected device.

5. A method for secure synchronization of data contained on a network-attached device and a network server, comprising:

establishing a device-to-device single-level secure processing state as between said network attached-device and said network server at a first defined security access level by
  (a) authenticating a user, said network attached device, and said network server;
  (b) determining an assigned security access level for said user from among a plurality of possible user security access levels; and
  (c) determining if said first defined security access level at which said user requests to sign on is lesser than or equal to said assigned security access level of said user;

synchronizing a first plurality of managed data objects stored on said network attached device and said network server at said first defined security access level establishing a second device to device single-level secure processing state as between said network-attached device and a locally-connected device that is locally connected to said network-attached device exclusive of any network connection, said network attached device and said locally-connected device connected at a second defined security access level;

selecting said network server to have a combination of an operating system and a file system selected from the group consisting of (a) a single level secure operating system and a multi-level secure file system, and (b) a multi-level secure operating system and a multi-level secure file system;

selecting said network-attached device to have a single-level secure operating system and a multi-level secure file system;

selecting said locally connected device to have a single-level secure operating system, and a multi-level secure file system;

prior to establishing said second device to device single-level secure processing state as between said network-attached device and a locally-connected device, determining if said locally-connected device supports said second defined security access level associated with said second device to device single level secure processing state;

automatically synchronizing a second plurality of managed data objects stored on said network-attached device and said locally connected device at said second defined security access level;

automatically re-synchronizing said first plurality of managed data objects stored on said network-attached device and said network server.

6. The method according to claim 5, further comprising:
selecting said locally connected device to have a single-level secure operating system, and a single-level secure file system;

automatically synchronizing a second plurality of managed data objects stored on said network-attached device and said locally connected device at said second defined security access level;

automatically re-synchronizing said first plurality of managed data objects stored on said network-attached device and said network server;

signing said user off of said computer network in response to a first user request;

in response to a second user request, signing said user back onto said computer network at a third security access level using network-attached device; and synchronizing a third plurality of managed data objects stored on said network-attached device and said network server at said third defined security access level provided in said multi-level secure file system of said network server and said multi-level secure file system of said network attached device.

7. The method according to claim 5, further comprising:
signing said user off of said computer network in response to a first user request;

in response to a second user request, signing said user back onto said computer network at a third security access level using network-attached device; and synchronizing a third plurality of managed data objects stored on said network-attached device and said network server at said third defined security access level provided in said multi-level secure file system of said network server and said multi-level secure file system of said network attached device.

8. A method for secure synchronization of data contained on a network-attached device and a network server, comprising:

establishing a device-to-device single-level secure processing state as between said network attached-device and said network server at a first defined security access level by
  (a) authenticating a user, said network attached device, and said network server;
  (b) determining an assigned security access level for said user from among a plurality of possible user security access levels; and (c) determining if said first defined security access level at which said user requests to sign on is lesser than or equal to said assigned security access level of said user;

establishing a second device to device single-level secure processing state as between said network-attached device and a locally-connected device that is locally connected to said network-attached device exclusive of any network connection, said network attached device and said locally-connected device connected at a second defined security access level;

selecting said network server to have a multi-level secure operating system and a multi-level secure file system;

selecting said network-attached device to have a multi-level secure operating system and a multi-level secure file system;

selecting said locally connected device to have a single-level secure operating system, and a single-level secure file system;

synchronizing a first plurality of managed data objects stored on said network attached device and said network server at said first defined security access level automatically synchronizing a second plurality of managed data objects stored on said network-attached device and said locally connected device at said second defined security access level.

9. The method according to claim 8, further comprising the step of automatically establishing said second device to device single level secure processing state prior to synchronizing said second plurality of managed data objects, and automatically terminating said second device to device single level secure processing state after synchronizing said second plurality of managed data objects.

10. The method according to claim 9, further comprising automatically re-synchronizing said first plurality of managed data objects stored on said network-attached device and said network server.

11. The method according to claim 10, further comprising:
automatically modifying an access level of said network attached device to a third defined security access level in said multi-level secure file system of said network-attached device;
automatically modifying an access level of said network server to said third defined security access level in said multi-level secure file system of said network server; and
synchronizing a third plurality of managed data objects stored on said network-attached device and said network server at said third defined security access level.

12. The method according to claim 8, further comprising selecting said locally connected device to have a combination of operating system and file system selected from the group consisting of (a) a single-level secure operating system, and a multi-level secure file system, and (b) a multi-level secure operating system, and a multi-level secure file system.

13. The method according to claim 12, further comprising:
determining if said locally-connected device supports said second defined security level;
automatically synchronizing a second plurality of managed data objects stored on said network-attached device and said locally connected device at said second defined security access level.

14. The method according to claim 13, further comprising automatically re-synchronizing said first plurality of managed data objects stored on said network-attached device and said network server.

15. The method according to claim 14, further comprising:
automatically modifying an access level of said network attached device to a third defined security access level in said multi-level secure file system of said network-attached device;
automatically modifying an access level of said network server to said third defined security access level in said multi-level secure file system of said network server; and
synchronizing a third plurality of managed data objects stored on said network-attached device and said network server at said third defined security access level.

16. The method according to claim 13, further comprising the step of automatically establishing said second device to device single level secure processing state prior to synchronizing said second plurality of managed data objects, and automatically terminating said second device to device single level secure processing state after synchronizing said second plurality of managed data objects.

17. The method according to claim 16, further comprising automatically setting an access level of said locally connected device in response to a command from said network attached device.

* * * * *